United States Patent [19]

Leung et al.

[11] Patent Number: 4,684,474

[45] Date of Patent: * Aug. 4, 1987

[54] ORGANOPHOSPHATE-CONTAINING ANTIFREEZE WITH BUFFER

[75] Inventors: Pak S. Leung, Highland Mills; William N. Matulewicz, Montgomery, both of N.Y.

[73] Assignee: First Brands Corporation, Danbury, Conn.

[*] Notice: The portion of the term of this patent subsequent to Sep. 23, 2003 has been disclaimed.

[21] Appl. No.: 633,209

[22] Filed: Jul. 23, 1984

[51] Int. Cl.$^4$ ................................................ C09K 5/00
[52] U.S. Cl. .................................... 252/75; 252/78.5; 252/180; 252/389.2; 252/389.23; 422/15
[58] Field of Search ............ 252/75, 78.5, 180, 389.2, 252/389.23; 422/15

[56] References Cited

U.S. PATENT DOCUMENTS

| | | | |
|---|---|---|---|
| 2,384,553 | 9/1945 | Kiffer | 252/389.2 |
| 3,282,846 | 11/1966 | Scott | 252/75 |
| 3,510,436 | 5/1970 | Silverstein et al. | 422/15 |
| 4,360,474 | 11/1982 | Brady et al. | 260/429.5 |
| 4,465,516 | 8/1984 | Danner et al. | 422/15 |

FOREIGN PATENT DOCUMENTS

EP2530 12/1977 European Pat. Off.
2756747 6/1979 Fed. Rep. of Germany.

*Primary Examiner*—Robert A. Wax
*Attorney, Agent, or Firm*—Gary L. Wamer

[57] ABSTRACT

Antifreeze composition containing at least one organophosphate in buffer/alcohol, together with method of using and composition.

12 Claims, No Drawings

ORGANOPHOSPHATE-CONTAINING ANTIFREEZE WITH BUFFER

CROSS REFERENCE TO RELATED APPLICATIONS

This application is related to the subject matter of concurrently filed U.S. application Ser. Nos. 633,210, and 633,444, now U.S. Pat. No. 4,613,445.

FIELD OF THE INVENTION

The present invention relates generally to heat transfer fluids and, more specifically, to an antifreeze containing an organophosphate as an anticorrosive agent in a borate, phosphate or borate/phosphate buffer.

BACKGROUND OF THE INVENTION

Conventional alcohol-based heat transfer fluids, such as automobile antifreezes, have the tendency to corrode the metal (e.g. most notably aluminum, but also copper, iron, brass and solder) surfaces of the heat transfer system. In automobile coolant systems, and aluminum corrosion that occurs not only damages the metal surface being attacked by corrosion, but also adversely affects other parts of the coolant system due to a phenomenon called "transport deposition". By virtue of transport deposition, soluble aluminum corrosion products formed at hot engine surfaces are carried to and precipitated on the cooler radiator tubes, where they form heat-insulating films or coatings that impair heat-transfer.

In view of this corrosion problem, numerous corrosion inhibitors have been developed over the years for use in antifreezes, including inorganic phosphates, silicates, phosphonates, borates, azoles, siliconates, nitrates, nitrites, and the like. The need for even more effective corrosion inhibitors in antifreezes has been fostered by the changing metalurgy of vehicular cooling systems in favor of increasing use of aluminum and by smaller, harder working automotive engines having high operating engine temperatures.

Certain organophosphate esters have been disclosed for use as lubricants and corrosion inhibitors. For example, ethylene oxide-containing organophosphates and propylene oxide-containing organophosphates and a method of preparing them are disclosed in U.S. Pat. No. 4,360,474. As an additional illustration, German patent publication Offen 2,756,747 discloses PO/EO and PO/BO-containing phosphate esters (wherein "EO" denotes ethylene oxide, "PO" denotes propylene oxide and "BO" denotes butylene oxide) useful as lubricants and corrosion inhibitors. The compounds of this publication are made by reacting polyphosphoric acid with aliphatic diols, triols, or tetrols. The organophosphates of the German publication have molecular weights between 200 and 8,000. This German application is primarily directed to low-foaming metalworking lubricating fluids and does not disclose antifreeze formulations.

OBJECT OF THE INVENTION

It is an object of the present invention to provide an antifreeze, and its corresponding concentrate, in a borate, phosphate, or borate/phosphate buffer which is characterized by reduced corrosiveness toward metals, including aluminum, as compared to conventional antifreezes.

This and other objects will become apparent from a reading of the following detailed specification.

SUMMARY OF THE INVENTION

In one aspect, the present invention relates to an antifreeze composition (herein also called "working antifreeze") comprising:
(a) alcohol,
(b) at least one buffer selected from the group consisting of salts of boric acid to provide a pH of between about 7 and about 10.5 for the composition, salts of phosphoric acid to provide a pH of between about 7 and about 9 for the composition, and a mixture of salts of boric and phosphoric acid to provide a pH of between about 7 and about 9 for the composition, and
(c) at least one organophosphate in a corrosion inhibiting-effective amount.

In another aspect, the present invention relates to an antifreeze concentrate from which the above composition can be made by dilution with water and/or alcohol.

In still another aspect, the present invention relates to a method of using the above antifreeze composition which comprises adding the antifreeze to an automobile engine coolant system.

DETAILED DESCRIPTION OF THE INVENTION

The preferred organophosphates useful in the present invention are those made by reacting phosphoric acids with aliphatic mono-ols, diols, triols or tetrols containing PO, PO/EO, PO/BO or PO/BO/EO with a high PO content of at least 50 wt. % based on the weight of the PO+BO+EO in the alcohol reactant. Such a reaction is well-known and is described by L. W. Burnette in *Nonionic Surfactants*, vol 1, p 372-394 (Marcel Dekker, Inc. 1966).

Generally the organophosphates useful in the present invention are identified by the structural formula:

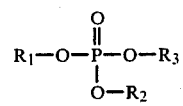

wherein each substituent $R_1$, $R_2$, and $R_3$ is selected from the class consisting of the following radicals: hydrogen; alkyl, aryl, alkenyl and alkynyl, with each of the foregoing having up to about 24 carbon atoms; alkyleneoxy, polyalkyleneoxy; phosphate or polyphosphate or their salts; and combinations thereof; with the proviso that at least one of said substituents is an organic radical within the class listed above or combinations thereof.

The preferred organophosphates have the structural formula identified above wherein at least one R substituent consists of an organic radical containing an alkylene oxide polymer or copolymer derivative of the form $R_4O(PO)_x(EO)_y(BO)_z—$, wherein the alkyleneoxide units may be either random or blocked and wherein $x > y > > z$ and $x+y+z \leq$ about 100, and $R_4$ is selected from the class of radicals: hydrogen; alkyl, aryl, alkenyl and alkynyl with the foregoing having up to about 24 carbon atoms; phosphate, polyphosphate and salts thereof, and combinations thereof. The molecular weight of these preferred organophosphates can vary over a wide range but is preferably less than about 10,000 to insure solubility in the antifreeze composition.

The amount of organophosphate employed in the concentrates of the present invention can vary over a wide range, but is preferably used in an amount of between 0.001 and about 30 weight percent, more preferably between about 0.005 and about 1, most preferably between about 0.005 and about 0.1, based on the weight of the concentrate. Below the 0.001 weight percent, the amount of organophosphate is expected to be insufficient to be effective, whereas above about 30 percent organophosphate is expected to provide no significant further corrosion inhibition benefits.

Preferred organophosphates are identified by structural formulae I to III, including the free acids and salts thereof, together with mixtures thereof.

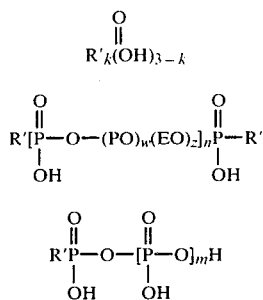

wherein
R′ = [RO(PO)$_x$(EO)$_y$] wherein R = H or alkyl, aryl, alkylaryl or arylalkyl having up to 24 carbon atoms
PO = Propylene oxide radical
EO = Ethylene oxide radical
x = 1 to 100
y = 0 to 100
k = 1 to 3, with the proviso that if k = 3, at least one R′ group is removed from the phosphate ester by hydrolysis prior to or during use
n = 1 to 100
w = 0 to 100 with the proviso that when w is ≧ 1, x can be zero
z = 0 to 100
m = 1 to 10

Within a given formula where x, y, w or z values appear more than once, the values may be the same or different numbers.

Typical useful classes of organophosphates falling within the groups identified by structural formulae I through III above, are identified as follows:

Example 1:
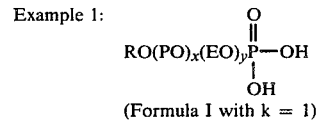
(Formula I with k = 1)

Example 2:
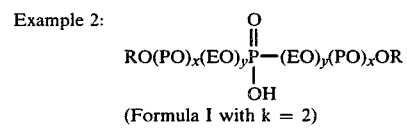
(Formula I with k = 2)

Example 3:
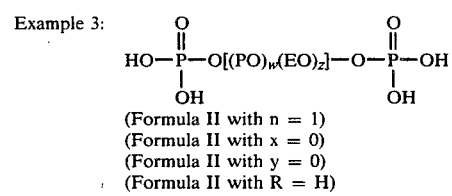
(Formula II with n = 1)
(Formula II with x = 0)
(Formula II with y = 0)
(Formula II with R = H)

Example 4:
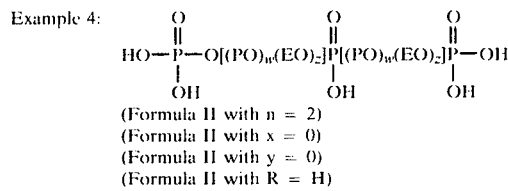
(Formula II with n = 2)
(Formula II with x = 0)
(Formula II with y = 0)
(Formula II with R = H)

Example 5:
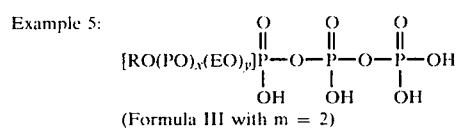
(Formula III with m = 2)

A buffer or mixture of buffers is employed in the antifreeze concentrates and compositions of the present invention. The buffer can be employed in a wide range of amounts, but is preferably used in an amount of between about 0.1 and about 10 wt. percent (more preferably between about 0.1 and about 5 wt. percent) based on the weight of the concentrate. Below about 0.1 wt. percent, the buffer would not be expected to be effective, whereas above about 10 wt. percent, the amount of buffer is expected to be too costly for a commercial antifreeze. The preferred buffer is borate, employed to provide a pH of between about 7 and about 10.5 for a 33 volume percent of concentrate in water. The borate useful in the composition concentrate of the present invention is conveniently added as the sodium tetraborate pentahydrate salt. This salt is readily commercially available. After adding the salt, addition of sodium hydroxide can be used to provide the desired mixture of metaborates and tetraborates and sodium hydroxide in the concentrate. Among other functions, the buffer serves to provide the desired pH and reserve alkalinity (RA) during use.

Other compounds useful as buffers in the composition concentrate of the present invention include: phosphates, such as alkali metal phosphates, employed at a pH of between about 7 and about 9, and mixtures of such phosphates with the above-discussed borates, the pH of the mixtures being between about 7 and about 9. As used herein pH is determined on the basis of 33 volume percent of concentrate in water.

The alcohol employed in the composition of this invention preferably is at least one alcohol selected from the group consisting of methanol, ethanol, propanol, ethylene glycol, diethylene glycol, triethylene glycol, propylene glycol, dipropylene glycol and glycerol. However, other alcohols can be used such as, for example, butylene glycol, and the monoacetate of glycerol, the dimethylether of glycerol alkoxyalkanols (such as methoxyethanol).

Optional additives may be employed in minor amounts of less than 50 wt. percent based on the weight of the concentrate. Typical optional additives would include, for example, known corrosion inhibitors for metals such as, for example, molybdates and benzoates, hydroxy benzoates or acids thereof, silicones, alkali metal nitrates, sebacates, alkali metal nitrites, tolyltriazole, mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide some corrosion inhibition with respect to the aluminum surfaces to be protected. Other typical optional additives would include wetting agents and surfactants such as, for example, known ionic and non-ionic surfactants such as the poly(oxyalkylene) adducts of fatty alcohols; antifoams and/or lubricants such as the well-known polysiloxanes and the polyoxyalkylene glycols, as well as any other minor ingredients known in the art that do not adversely affect the aluminum corrosion resistance sought to be achieved.

The following example is merely illustrative of, and not intended to limit the present invention.

EXAMPLE 1

In order to demonstrate a pH range for which borate, phosphate and borate/phosphate buffered organophosphate antifreezes provide effective corrosion inhibition, as compared to corresponding control examples without organophosphate, the following tests were conducted.

A. Preparation of Antifreezes

Each of the antifreeze compositions described in Tables 1 through III below were prepared by mixing the individual components of each composition together, in the sequence listed and in the amounts specified in the tables.

Each composition was tested as described below in the form of a working antifreeze made by diluting 33 vol. % of each composition with 67 vol. % of "corrosive water" (deionized water containing 300 ppm. each of $SO_4^=$, $HCO_3^-$ and $Cl^-$, all added as the Na salts).

B. Laboratory Aluminum Disc Heat Flux Test: Method, Apparatus and Results

A test method used in the industry was employed to determine the corrosion inhibitory effect of the formulated composition of the present invention with respect to heat rejecting aluminum surfaces. This test method is described in *Corrosion*, 15, 257t at 258t (1959) "Laboratory Methods for Determining Corrosion Rates Under Heat Flux Conditions" and also in an ASTM publication entitled, "Engine Coolant Testing: State of the Art," a symposium sponsored by ASTM Committee D-15, at pages 17–19 (Printed, May 1980), both incorporated herein by reference. A summary of the test equipment and procedure follows:

The apparatus consists of a 1 liter flask, fitted with a condenser, a thermometer, a cold finger, a temperature controller, a 1½ inch diameter × ¼ inch thick No. 319 aluminum casting alloy (herein "the aluminum disc"), and a soldering iron heat source.

The apparatus was charged with 750 ml. of the above-diluted test solution and heated to effect boiling at the aluminum disc surface and to maintain a solution temperature of about 75° C. The test duration was 168 hours. The weight loss of aluminum from the aluminum disc was determined and used as a measure of corrosion inhibitor effectiveness.

TABLE I

BORATE BASED COMPOSITIONS (WT. % OF EACH COMPONENT)

| | Composition | | | | | | | | | |
|---|---|---|---|---|---|---|---|---|---|---|
| | 1 | 2 | 3 | 4 | 5 | 6 | 7 | 8 | 9 | 10 |
| Component | | | | | | | | | | |
| Ethylene Glycol | 98.5200 | 98.5121 | 98.4897 | 98.3394 | 97.0537 | 98.4950 | 98.4871 | 98.4647 | 98.3144 | 97.0287 |
| $Na_2B_4O_7 \cdot 5H_2O$ | 0.8880 | 0.9266 | 0.9820 | 1.3531 | 1.9460 | 0.8880 | 0.9266 | 0.9820 | 1.3531 | 1.9460 |
| NaOH (50% aqueous) | 0.5920 | 0.5613 | 0.5283 | 0.3075 | — | 0.5920 | 0.5613 | 0.5283 | 0.3075 | — |
| $H_3BO_3$ | — | — | — | — | 1.0003 | — | — | — | — | 1.0003 |
| CYCLOPHOS PV-4[1] | — | — | — | — | — | 0.0250 | 0.0250 | 0.0250 | 0.0250 | 0.0250 |
| Physical Properties and Test Data | | | | | | | | | | |
| pH[2] | 10.7 | 9.8 | 8.9 | 8.0 | 7.4 | 10.7 | 9.8 | 9.0 | 8.0 | 7.4 |
| ASTM RA[3] | 5.0 | 5.3 | 5.3 | 5.5 | 4.9 | 4.9 | 5.4 | 5.3 | 5.1 | 4.9 |
| Al Disc Wt. Loss | 57 | 92.9 | 90.7 | 65.2 | 67 | 60 | 70.4 | 55.2 | 45.0 | 1 |

FOOTNOTES:
[1] CYCLOPHOS PV-4, a propylene oxide/ethylene oxide based phosphate ester product of Cyclo Chemicals, Inc.
[2] pH was measured on the working antifreeze.
[3] ASTM-D-1121 RA in accordance with which a 10 ml. sample of working antifreeze is diluted to 100 ml. with water and titrated with 0.1 N HCl to a pH of 5.5. The volume of HCl use represents the ASTM reserve alkalinity or RA.

TABLE II

PHOSPHATE BASED COMPOSITIONS (WT. % OF EACH COMPONENT)

| | Composition | | | | | |
|---|---|---|---|---|---|---|
| | 11 | 12 | 13 | 14 | 15 | 16 |
| Component | | | | | | |
| Ethylene Glycol | 96.2537 | 96.0760 | 95.8997 | 96.2287 | 96.0510 | 95.8747 |
| $H_3PO_4$ (75% aqueous) | 1.6538 | 1.7640 | 1.8734 | 1.6538 | 1.7640 | 1.8734 |
| NaOH (50% aqueous) | 2.0925 | 2.1600 | 2.2269 | 2.0925 | 2.1600 | 2.2269 |
| CYCLOPHOS PV-4[1] | — | — | — | 0.0250 | 0.0250 | 0.0250 |
| Physical Properties and Test Data of Working Antifreeze | | | | | | |
| pH[2] | 9.9 | 8.8 | 8.1 | 9.9 | 8.8 | 8.1 |
| ASTM RA[3] | 5.0 | 5.2 | 5.1 | 5.1 | 5.2 | 5.1 |
| Al Disc Wt. Loss | 95.7 | 88.6 | 73.9 | 120.8 | 72.5 | 14.1 |

FOOTNOTES:
[1] CYCLOPHOS PV-4, a propylene oxide/ethylene oxide based phosphate ester product of Cyclo Chemicals, Inc.
[2] pH was measured on the working antifreeze.
[3] ASTM-D-1121 RA in accordance with which a 10 ml. sample of working antifreeze is diluted to 100 ml. with water and titrated with 0.1 N HCl to a pH of 5.5. The volume of HCl use represents the ASTM reserve alkalinity of RA.

TABLE III
BORATE/PHOSPHATE BASED COMPOSITIONS (WT. % OF EACH COMPONENT)

| | Composition | | | | | |
|---|---|---|---|---|---|---|
| Component | 17 | 18 | 19 | 20 | 21 | 22 |
| Ethylene Glycol | 97.5907 | 97.6052 | 97.7400 | 97.5657 | 97.5802 | 97.7150 |
| $Na_2B_4O_7.5H_2O$ | 0.6369 | 0.7358 | 1.6640 | 1.6369 | 0.7358 | 1.6640 |
| $H_3PO_4$(75% aqueous) | 0.6213 | 0.5872 | 0.2680 | 0.6213 | 0.5872 | 0.2680 |
| NaOH (50% aqueous) | 1.1511 | 1.0718 | 0.3280 | 1.1511 | 1.0718 | 0.3280 |
| CYCLOPHOS PV-4[1] | — | — | — | 0.0250 | 0.0250 | 0.0250 |
| Physical Properties and Test Data of Working Antifreeze | | | | | | |
| pH[2] | 9.8 | 8.9 | 7.8 | 9.7 | 8.9 | 7.9 |
| ASTM RA[3] | 5.4 | 5.4 | 5.3 | 5.2 | 5.3 | 4.6 |
| Al Disc Wt. Loss | 513.6 | 721.4 | 299.3 | 572.5 | 572.9 | 275.8 |

FOOTNOTES:
[1] CYCLOPHOS PV-4, a propylene oxide/ethylene oxide based phosphate ester product of Cyclo Chemicals, Inc.
[2] pH was measured on the working antifreeze.
[3] ASTM-D-1121 RA in accordance with which a 10 ml. sample of working antifreeze is diluted to 100 ml. with water and titrated with 0.1 N HCl to a pH of 5.5. The volume of HCl use represents the ASTM reserve alkalintiy or RA.

The results for the aluminum desk test as presented in Tables I–III show specific pH ranges over which organophosphate in the individual buffer systems tested is particularly effective in terms of aluminum corrosion inhibition. For example, CYCLOPHOS PV-4 organophosphate in a borate buffer (Table I) provided a significant reduction in weight loss below a pH of 10.7, as compared to analogous antifreezes with buffer but no CYCLOPHOS PV-4. Compare working antifreezes made from compositions 1 through 5 (buffer without organophosphate) with 6 through 10 (buffer with organophosphate), respectively and note the reduction in wt. loss when CYCLOPHOS PV-4 was added over the entire pH range tested below 10.7. Note that at a pH of 10.7, the borate plus organophosphate (composition 6) provided a higher weight loss of 60 mg., as compared to a 57 mg. weight loss provided by the borate without organophosphate composition (composition 1). These results support a conclusion that organophosphate, such as CYCLOPHOS PV-4, provides a corrosion inhibition benefit in a borate buffer system at a pH of between about 7 and about 10.5.

In contrast, the data in Table II show that CYCLOPHOS PV-4 in a phosphate buffer system provides improved aluminum corrosion protection, as compared to the phosphate buffer system without the addition of CYCLOPHOS PV-4, below a pH value of 9.9. Compare the working antifreezes made from compositions 12 and 13 (buffer without organophosphate) with compositions 15 and 16 respectively and note the reduction in weight loss in this pH range with the addition of the organophosphate. Note that, at a pH of 9.9, the phosphate plus organophosphate (composition 14) yielded a higher weight loss of 120.8 mg., as compared to 95.7 mg. weight loss provided by just the phosphate buffer (composition 11). Thus CYCLOPHOS PV-4 organophosphate in a phosphate buffer system only provided improved corrosion resistance for antifreeze in the disk test at a pH of less than 9.9. These results indicate that organophosphates, such as CYCLOPHOS PV-4, would provide a corrosion inhibition benefit in a phosphate buffer system at a pH of between about 7 and about 9 on aluminum. Below a pH of 7, excessive corrosion on iron in the cooling system is expected.

Likewise, the results are presented in Table III for a phosphate/borate buffer mixture show that CYCLOPHOS PV-4 organophosphate does not improve corrosion performance in the disk test for the antifreeze at a pH of 9.7–9.8 (compare the antifreeze made from Composition 20 (572.5 mg. wt. loss) with that made from Composition 17 (513.6 mg. wt. loss)). However, at the lower pHs tested (8.9 and 7.9), the presence of CYCLOPHOS PV-4 organophosphate did provide improved results in the disk test. These results support a conclusion that organophosphates, such as CYCLOPHOS PV-4, would provide a corrosion inhibition benefit in a borate/phosphate buffer system at a pH of between about 7 and about 9 on aluminum.

It is surprising that all buffer systems did not provide the same pH range for best corrosion inhibition activity by organophosphate.

While this invention has been described with reference to certain specific embodiments, it will be recognized by those skilled in this art that many variations are possible without departing from the scope and spirit of the invention and that it is intended to cover all changes and modifications of the invention disclosed herein for the purposes of illustration which do not constitute departure from the spirit and scope of the invention.

We claim:
1. An antifreeze composition concentrate comprising:
   (a) alcohol,
   (b) at least one buffer selected from the group consisting of salts of boric acid to provide a pH of between about 7 and about 10.5 for the composition, salts of phosphoric acid to provide a pH of between about 7 and about 9 for the composition, and a mixture of salts of boric and phosphoric acid to provide a pH of between about 7 and about 9 for the composition, and
   (c) at least one alkylene oxide-containing organophosphate, in a corrosion inhibiting-effective amount, said organophosphate having a molecular weight of below about 10,000 and being selected from the group defined by the following structural formulae I, II and III:

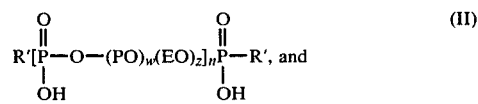

-continued

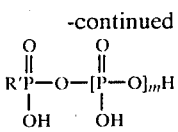

wherein
$R' = [RO(PO)_x(EO)_y]$ wherein R=H or alkyl, aryl, alkylaryl, arylalkyl, alkenyl or alkynyl having up to 24 carbon atoms,
PO=Propylene oxide radical,
EO=Ethylene oxide radical,
x=1 to 100,
y=0 to 100,
k=1 to 3, with the proviso that when k=3, at least one R' group is removed from the phosphate ester by hydrolysis prior to or during use,
n=1 to 100,
w=0 to 100, with the proviso that when $w \geq 1$, x can be zero,
z=0 to 100
m=1 to 10.

2. The composition of claim 1 wherein said organophosphate has at least one R substituent consisting of an organic radical containing an alkylene oxide polymer or copolymer derivative of the form $R_4O(PO)_x(EO)_y(BO)_z-$, wherein the alkyleneoxide units may be either random or blocked and wherein $x>y>>z$ and $x+y+z \leq$ about 100, and $R_4$ is selected from the class of radicals: hydrogen; alkyl, aryl, alkenyl and alkynyl with the foregoing having up to about 24 carbon atoms; phosphate, polyphosphate and salts thereof, and combinations thereof.

3. The composition of claim 1 wherein component (c) is present in an amount of between about 0.001 and about 30 weight percent based on the total weight of the concentrate.

4. The composition of claim 1 wherein component (c) is present in an amount of between about 0.005 and about 1 weight percent based on the total weight of the concentrate.

5. The composition of claim 1 wherein component (c) is present in an amount of between about 0.005 and about 0.1 weight percent based on the total weight of the concentrate.

6. The composition of claim 1 wherein component (b) is present in an amount of between about 0.1 and about 10 weight percent based on the total weight of the concentrate.

7. The composition of claim 1 wherein component (b) is present in an amount of about 0.1 and about 5 weight percent based on the total weight of the concentrate.

8. A method of cooling an automobile engine which comprises, the step of adding the antifreeze composition of claim 1 to an automobile engine coolant system.

9. A method of preparing the antifreeze composition of claim 1 wherein said organophosphate is added to an antifreeze cooling system containing said alcohol and said buffer at the use site, said organophosphate being added in concentrated form or as a solution thereof.

10. An antifreeze concentrate that produces the composition of claim 1 upon the addition of water or alcohol.

11. The composition of claim 1 wherein said buffer consists essentially of salts or boric acid.

12. An antifreeze composition comprising:
(a) ethylene glycol,
(b) a buffer consisting of salts of boric acid to provide a pH of between about 7 and about 10.5 for the composition; and,
(c) at least one alkylene oxide-containing organophosphate, in a corrosion inhibiting-effective amount, said organophosphate having a molecular weight of below about 10,000 and being selected from the group defined by the following structural formulae I, II and III:

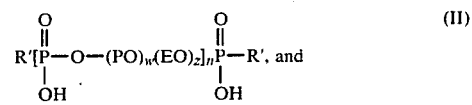

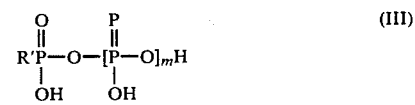

wherein
$R' = [RO(PO)_x(EO)_y]$ wherein R=H or alkyl, aryl, alkylaryl, arylalkyl, alkenyl or alkynyl having up to 24 carbon atoms,
PO=Propylene oxide radical,
EO=Ethylene oxide radical,
x=1 to 100,
y=0 to 100,
k=1 to 3, with the proviso that when k=3, at least one R' group is removed from the phosphate ester by hydrolysis prior to or during use,
n=1 to 100,
w=0 to 100, with the proviso that when $w \geq 1$, x can be zero,
z=0 to 100,
m=1 to 10.

* * * * *